United States Patent Office 3,373,032
Patented Mar. 12, 1968

3,373,032
ESTROGENIC COMPOUNDS AND ANIMAL GROWTH PROMOTERS
Jerome L. Martin, Terre Haute, Ind., assignor to Commercial Solvents Corporation, a corporation of Maryland
No Drawing. Continuation-in-part of application Ser. No. 561,401, June 29, 1966. This application Mar. 3, 1967, Ser. No. 620,269
10 Claims. (Cl. 99—2)

ABSTRACT OF THE DISCLOSURE

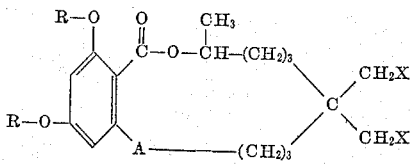

where A is a radical selected from the group consisting of —CH=CH— and —CH$_2$—CH$_2$—, R is selected from the group consisting of hydrogen, lower alkyl and benzyl, and X is selected from the group consisting of nitro- and amino-; and animal feeds containing growth promoting amounts thereof.

---

This application is a continuation-in-part of application Ser. No. 561,401, filed June 29, 1966, now abandoned.

This present invention relates to new compounds and an object of the present invention is to provide compounds which exhibit estrogenic activity or aid in increasing the rate of growth in meat-producing animals, e.g., cattle, lamb and swine.

The compounds of this invention are illustrated by the formula:

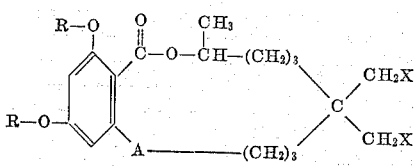

where A is —CH$_2$—CH$_2$— or —OH=CH—; R is hydrogen, substituted or unsubstituted alkyl, e.g. lower alkyl such as methyl, ethyl, hexyl, etc., or aralkyl, e.g. benzyl; and X is nitro- or amino-.

The compounds of the present invention can be produced from the compound:

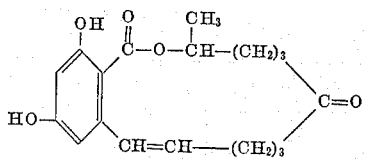

hereinafter referred to as the fermentation estrogenic substance (F.E.S.) by reaction with nitromethane in the presence of, for example, dibutylamine catalyst. The hydroxyl groups on the benzene ring of F.E.S. can be converted to ethers, e.g., methyl ethers, as taught in U.S. Patent 3,239,342. Benzyl ethers of F.E.S. are described in copending application Ser. No. 532,113, filed Mar. 7, 1966, now abandoned, and application Ser. No. 620,259, filed Mar. 3, 1967, and dihydro F.E.S. where A is —CH$_2$—CH$_2$— is described in U.S. Patent 3,239,354. In producing compounds where X is amino-, the nitro compound is first produced and then reduced.

The compounds can be administered to animals by any suitable method including oral and parenteral administrations. For example, the compound can be blended with ordinary feed containing nutritional values in an amount sufficient to produce the desired rate of growth and can thus be fed directly to the animals, or the compound can be suspended in a suitable injection suspension medium such as peanut oil and injected parenterally. The amount of compound fed to an animal, of course, varies depending upon the animal, desired rate of growth and the like.

When the new compounds are to be administered in feeds, an animal feed composition may be prepared containing the usual nutritionally-balanced quantities of carbohydrates, proteins, vitamins and minerals, together with the compound of the present invention. Some of these usual dietary elements are grains, such as ground grain and grain by-products; animal protein substances, such as those found in fish meal and meat scraps, vegetable proteins like soybean oil meal or peanut oil meal; vitaminaceous materials, e.g., vitamin A and D mixtures; riboflavin supplements and other vitamin B complex members; and bone meal and limestone to provide minerals. A type of conventional feed material for use with cattle includes alfalfa hay and ground corn cobs together with supplementary vitaminaceous substances if desired.

The following examples serve to illustrate the invention.

Example I

To a mixture of 1 mole of F.E.S., there are added 126 grams (2 moles) of nitromethane and 70 grams of dibutylamine catalyst. The mixture is refluxed for 30 hours after which it is poured into sufficient 6 N hydrochloric acid to neutralize the dibutylamine. This operation is conducted with cooling so that the temperature does not rise above 50° C.

The two layers are separated and the non-aqueous layer is subjected to distillation at 25 torr. About 40% of the initial F.E.S. is converted to the desired product.

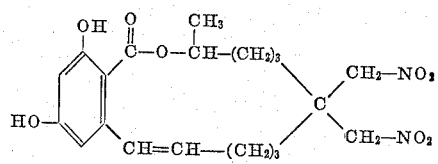

The unconverted F.E.S. and the product are separated by column chromatography.

The dibutylamine in the aqueous layer is recovered, by addition of caustic to neutralize the HCl followed by distillation.

Example II

Dihydro F.E.S., F.E.S.-2,4-dimethylether, F.E.S.-2-methyl ether, F.E.S-4-benzylether and dihydro FES-2,4-diethylether are reacted according to the procedure of Example I to produce the corresponding nitromethyl-substituted compound.

Example III

Two moles of the product of Example I are reduced with 750 grams of cast iron turnings. The cast iron turnings are placed with 1000 cc. of water in a three necked flask fitted with a stirrer, a thermometer and an efficient condenser. One hundred twenty cc. of concentrated HCl are added and the mixture heated to 100° C. while stirring. The product of Example I (2 moles) is added along with 300 cc. of conc. HCl intermittently in small amounts while maintaining the temperature at 100–103° C. After all materials are added, the temperature is maintained at 100° C. for 2 hours and the mixture is filtered to yield

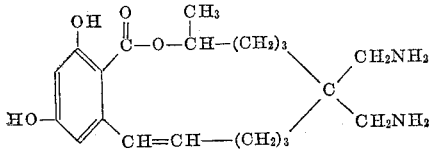

Example IV

The nitromethyl-substituted F.E.S. compounds of dihydro F.E.S., F.E.S.-2,4-dimethylether, F.E.S-2-methylether, F.E.S.-4-benzylether and dihydro F.E.S.-2,4-diethylether produced according to Example II are hydrogenated according to the procedure of Example III to produce the corresponding amino-substituted compound.

Example V

Six head of cattle are fed a daily ration containing 5 to 20 grams of the compound of Example I per 100 pounds ration to improve their rate of growth.

Example VI

Six head of cattle are fed a daily ration containing 5 to 20 grams of the compound of Example III per 100 pounds ration to improve their rate of growth.

The following are specific examples of animal feed compositions of this invention useful for increasing the rate of growth and feed efficiency of young animals to market weight.

Example VII

For young beef cattle, i.e., calves to yearlings running to two years old, each animal is given 5 to 20 milligrams per day of the compound produced in Example I intimately admixed in about 18 to 22 pounds per head per day of a complete pelleted ration for about 180 days. The complete pelleted ration includes in addition to the compound of Example I the following:

| | |
|---|---|
| Barley _____percent__ | 40–43 |
| Mollasses dried beet pulp _____do____ | 34.5–37.5 |
| Alfalfa pellets _____do____ | 8.0 |
| Tallow _____do____ | 2.5 |
| Calcium carbonate _____do____ | .30 |
| Urea _____do____ | .30 |
| Phosphorus source _____do____ | .40 |
| Salt _____do____ | .50 |
| Molasses _____do____ | 10.00 |
| Trace mineral _____do____ | 0.5 |
| Vitamin A _____MMI.U./ton__ | 2–4 |

*Note.*—Milo or corn, for example, can be substituted for the barley.

The compound of Example I is admixed with the above ingredients in a stationary blender or a feed mix truck in the following amounts in grams per ton to provide an appropriate complete pelleted feed with dosage levels ranging from 5 to 90 milligrams per head per day.

| Grams/ton: | Mg./head/day |
|---|---|
| .5 | 5 |
| 1.0 | 10 |
| 2.0 | 20 |
| 4.0 | 40 |
| 8.0 | 80 |

These gram amounts are premixed with, for example, 10 pounds of soybean hulls prior to admixture with the other ingredients.

Example VIII

For young swine, i.e., six-week old pigs to about 100-pound pigs, each animal is given 5 to 20 milligrams per day of the compound of Example III intimately admixed in about 1½ to 5½ pounds per head per day of a grower ration until it reaches a weight of about 100 pounds. When the swine weigh between 90 and 125 pounds the feed is changed to one whereby each animal is given 20 to 50 milligrams per day of the compound of Example III intimately admixed in about 5½ to 10 pounds per head per day of a finisher ration until it reaches market weight of about 220 pounds. The grower and finisher ration include in addition to the compound of Example III the following:

| | Grower, percent | Finisher, percent |
|---|---|---|
| Ground Yellow Corn | 77 | 86.7 |
| Soybean Meal (44% protein) | 16 | 6.5 |
| Meat and Bone Scraps (50% protein) | 2.5 | 2.5 |
| Dehydrate Alfalfa Meal (17%) | 2.5 | 2.5 |
| Steamed Bone Meal | 0.5 | 0.5 |
| Ground Limestone | 0.5 | 0.3 |
| Iodized Salt | 0.5 | 0.5 |
| Vitamin, Antibiotic and Trace Mineral Premix | 0.5 | 0.5 |

The compound of Example III is admixed with the above ingredients in a blender in the following amounts in milligrams per pound to provide an appropriate feed with dosage levels ranging from 6 to 96 milligrams per head per day.

| Mg./pound | Mg./head/day |
|---|---|
| 2 | 6 |
| 4 | 12 |
| 8 | 24 |
| 16 | 48 |
| 32 | 96 |

Example IX

For 4- to 10-month old lambs weighing 50 to 70 pounds, each animal is given 1 to 15 milligrams per day of the compound of Example I, intimately admixed in about 3 to 6 pounds per head per day of a complete ration for 30 to 90 days. The complete ration includes in addition to the compound of Example I the following:

| | Pounds |
|---|---|
| Finely ground corn cobs | 630 |
| Ground corn | 600 |
| Dehydrated alfalfa meal | 300 |
| Dried molasses | 120 |
| Soybean meal (44% protein) | 300 |
| Dicalcium phosphate | 14 |
| Trace mineral salt | 17 |
| Premix vitamin, mineral and antibiotic | 19 |

The compound of Example I is admixed with the above ingredients in a blender in the following amounts in milligrams per pound to provide an appropriate complete feed with dosage levels ranging from 1 to 15 milligrams per head per day.

| Mg./pound | Mg./head/day |
|---|---|
| .5 | 2 |
| 1.0 | 4 |
| 1.5 | 6 |
| 2.0 | 8 |
| 2.5 | 10 |
| 3.75 | 15 |

Example X

For broilers, i.e., day old to four week old chicks, a grower feed is prepared for feeding to the chicks for the first four weeks and a finisher feed is prepared for feeding the four-week-old chicks for the last five weeks until they reach market weight of two and a half to three pounds dressed. For each pound of weight gain, the chicks eat about 1.5 to 2 pounds of feed. Thus they eat about 1.5 pounds of feed during the first four weeks and about five pounds of feed during the next five weeks. During the course of this feeding schedule, each bird should receive a total of about 12 to 36 milligrams of the compound of Example III in the grower and finisher feed each of which includes in addition to the compound of Example III the following:

|  | Grower (lbs.) | Finisher (lbs.) |
|---|---|---|
| Ground Yellow Corn | 1,000 | 1,200 |
| Soybean Meal (44% Protein) | 700 | 500 |
| Fish Meal (60% Protein) | 100 | 80 |
| Alfalfa Meal | 50 | 50 |
| Meat and Bone Scraps | 0 | 30 |
| Animal Fat | 80 | 80 |
| Dicalcium Phosphate | 35 | 40 |
| Iodized Salt | 10 | 10 |
| Limestone | 15 | ----- |
| Premix Vitamins Trace Minerals and Antibiotics | 10 | 10 |

It is claimed:

1. 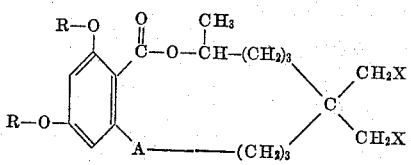

where A is a radical selected from the group consisting of —CH=CH— and —CH$_2$—CH$_2$—, R is selected from the group consisting of hydrogen, lower alkyl and benzyl, and X is selected from the group consisting of nitro- and amino-.

2. The compound of claim 1 where X is nitro- and A is —CH=CH.

3. The compound of claim 2 where R is hydrogen.

4. The compound of claim 1 where X is nitro and A is —CH$_2$—CH$_2$—.

5. The compound of claim 4 where R is hydrogen.

6. The compound of claim 1 where X is amino and A is —CH=CH—.

7. The compound of claim 6 where R is hydrogen.

8. The compound of claim 1 where A is amino and A is —CH$_2$—CH$_2$—.

9. The compound of claim 8 where R is hydrogen.

10. An animal feed composition comprising a nutrient ration and a growth promoting amount of the compound of claim 1.

No references cited.

A. LOUIS MONACELL, *Primary Examiner.*

H. H. KLARE III, *Assistant Examiner.*